Jan. 3, 1956 E. J. SANDERS 2,729,202
FLUID CIRCULATION SYSTEMS
Filed March 23, 1951 4 Sheets-Sheet 1

ELMORE J. SANDERS,
INVENTOR.

BY Houloin White

ATTORNEY.

Jan. 3, 1956  E. J. SANDERS  2,729,202
FLUID CIRCULATION SYSTEMS
Filed March 23, 1951  4 Sheets-Sheet 4

ELMORE J. SANDERS,
INVENTOR.

BY
ATTORNEY.

United States Patent Office 2,729,202
Patented Jan. 3, 1956

2,729,202

FLUID CIRCULATION SYSTEMS

Elmore J. Sanders, San Gabriel, Calif.

Application March 23, 1951, Serial No. 217,253

25 Claims. (Cl. 123—41.04)

This invention relates to improved fluid circulating apparatus particularly adapted for circulating air in a temperature control system. The invention in certain of its aspects is especially concerned with regulating the circulation of temperature controlling air in an internal combustion engine installation. The present application is a continuation-in-part of my co-pending application Serial No. 157,765, filed April 24, 1950 now Patent No. 2,626,744, issued January 27, 1953, entitled "Variable Flow Fluid Displacement Rotor."

In the past, considerable difficulty has been encountered in controlling the operating temperatures of engines and other types of equipment. Especially in colder climates, it has been very difficult to maintain all parts and accessories of an engine at temperatures assuring most efficient, or even satisfactory, operation. For instance, one heretofore unsolved problem has been that of maintaining the usual engine cooling radiator at proper temperatures during those periods when little or no water is being circulated. In the conventional engine, when the ambient temperature is very low and consequently very little water circulation is required, the same body of water may remain in the radiator for a relatively extended period, and be cooled to a dangerously low temperature before the control thermostat ultimately calls for its delivery to the engine. This cold water discharging into the warm engine may of course have any number of adverse effects on the engine, all tending to decrease the efficiency of the engine and shorten its life.

In addition to the radiator, a second part of the engine which is normally unprotected against undesired temperatures is the lubricating oil reservoir or crankcase. In prior installations, the crankcase portion of the engine has been highly susceptible to cooling by low ambient temperatures to an extent causing rapid development of sludge in the oil, as a result of which the engine is poorly lubricated and subject to excessive wear. Still further adverse effects have been caused by too low temperatures of the air being drawn into the engine intake system, as well as the air in the crankcase breathing system.

The general object of the present invention is to provide an improved air circulating system adapted to positively maintain all parts and accessories of an engine or other piece of operating equipment at proper temperatures. Particularly contemplated is apparatus not only adapted to produce the usual draft of cooling air through a radiator or the like when required, but also operable during non-cooling periods to produce a circulation of warm air about the equipment. This warm air is preferably circulated directly through the engine cooling radiator to very effectively prevent any sharp drop in radiator temperatures during periods of no water circulation. As will appear, the air circulated in non-cooling condition may be warmed by being directed, during its course of flow, over the main heated body portion of the engine.

Structurally, I employ for attaining both the cooling and warming circulations of air a unique combination of a fan, shutter, and baffle means, so relatively positioned that the fan is convertible by adjustment of the shutter, between two distinct flow conditions. Specifically, in cooling condition, the fan acts as an axial flow fan creating a flow of cooling air through the radiator, whereas upon closing of the shutters, the fan commences to act as a centrifugal impeller operable to draw warm air from over the engine and discharge it radially outwardly. The associated baffle, preferably in the form of a tubular shroud is positioned in the path of the radially outwardly discharged warm air to deflect it in a direction axially of the fan for effecting the desired warm air circulation. To assure proper deflection of the air in an axial direction, the shroud or baffle should have a converging or angular portion positioned directly outwardly of the fan blades.

In order that the fan may take its suction from over the warm engine, when acting as a centrifugal impeller, the shutter extends across the face of the fan at a side away from the engine. As will appear, the fan and shutter may be positioned either between the engine and radiator in conventional manner, or forwardly of both the engine and radiator. If the fan and shutter are between the engine and radiator, the baffle means about the fan may act to split the radially discharged warm air into two streams, one being directed forwardly to warm the radiator and combat wind or forward motion air, and the other being directed rearwardly to circulate the engine compartment. When the fan and shutter are positioned forwardly of the radiator, the fan acts in non-cooling condition to create a single circulation of warm air through both the radiator and engine compartment.

In my copending application Serial Number 49,507, filed September 16, 1948, now Patent No. 2,626,743, issued January 27, 1953, entitled "Air Displacement Rotor"; and my copending application Serial Number 157,765, filed April 24, 1950, now Patent No. 2,626,744, issued January 27, 1953, entitled "Variable Flow Fluid Displacement Rotor," I have disclosed a novel type of fluid displacement rotor comprising a normally axial flow fan having shutter means rotatable with the fan and adapted in a closed condition to extend across the face of the fan in a manner converting it to a radially discharging centrifugal impeller. A particular object of the present invention is to provide fluid circulation systems of the above discussed types and employing this specially constructed type of rotor.

In order that the fan of the present systems may serve efficiently as a centrifugal impeller, it is highly important that the shutter means when closed be positioned in very close proximity to the fan blades. When the specially constructed rotor of my above applications is employed, an optimum condition may be attained by actually forming the fan blades themselves to carry portions of the shutter means.

The above and other features and objects of the present invention will be better understood from the following detailed description of the typical embodiments illustrated in the accompany drawings, in which.

Figure 1:
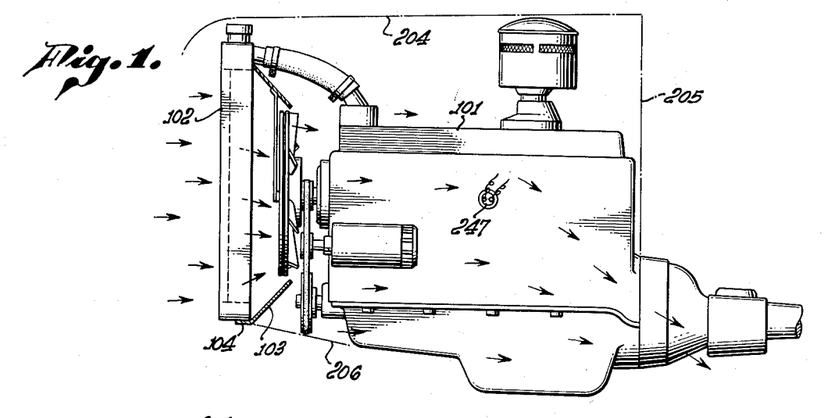
Fig. 1 is a side view of a first form of internal combustion engine temperature control system, showing the apparatus in its radiator cooling condition.
Figure 2:
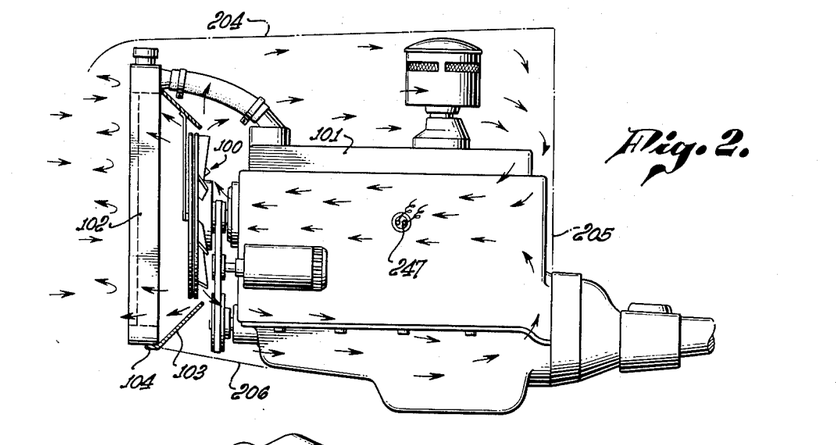
Fig. 2 is a view corresponding to Fig. 1 but showing the apparatus in a non-cooling condition.
Figure 3:
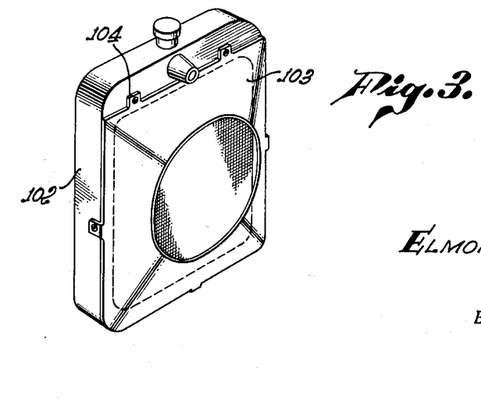
Fig. 3 is a perspective view of the air directing shroud of Figs. 1 and 2.

Referring first to Figs. 1 to 3, the engine temperature control system there shown includes a variable flow fan 100 mounted at the forward end of a conventional internal combustion engine 101 and facing the usual upstanding engine cooling radiator 102. As will appear, the fan is adjustable between an open axial flow condition in which it creates a flow of cooling air rearwardly through the radiator, and a closed condition in which it acts as a centrifugal impeller discharging warm air radially outwardly. The engine is contained within a compartment defined at its top and sides by the usual hood 204, at its rear by a vertical partition 205, and across a portion of its underside by bottom wall 206.

A tubular shroud 103 extends rearwardly from the outer edge of the radiator to a position about the fan to direct air between the radiator and fan. This shroud is of rectangular section corresponding to the radiator at its forward edge and converges rearwardly to a circular section only slightly larger than the fan (see Fig. 3). At its rear edge, the shroud extends to a condition of axially overlapping relation with the fan, as shown, so that when the fan is acting as a centrifugal impeller, the shroud deflects a portion of the radially outwardly discharged air forwardly toward the radiator. The shroud is mounted in the illustrated position in any suitable manner, as by mounting ears 104 welded to the radiator.

Figures 4, 5, 6, 7:
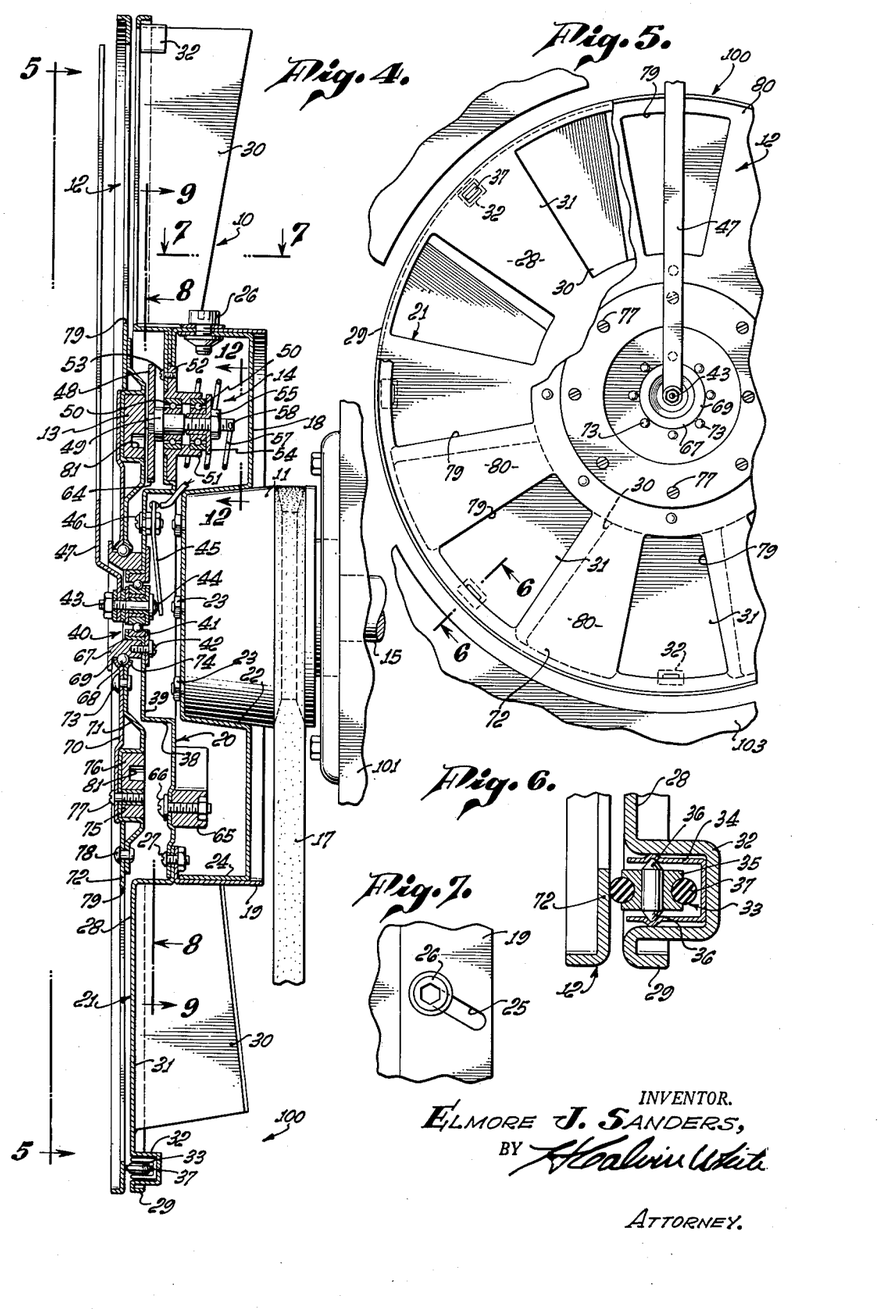
Fig. 4 is an enlarged vertical section through the fan of Figs. 1 and 2.
Fig. 5 is a fragmentary front view of the fan taken on line 5—5 of Fig. 4 and partly broken away to show the rear bladed section.
Fig. 6 is an enlarged fragmentary section through one of the outer spacing rollers taken on line 6—6 of Fig. 5.
Fig. 7 is an enlarged fragmentary view taken on line 7—7 of Fig. 4.

As best seen in Fig. 4, the fan comprises essentially a rear vaned fan section 10 carried by and rotatable with the usual fan driving hub 11 on the engine, a forward shutter section 12 mounted for rotation with and relative to the rear section and having an annular detent cam member 13 mounted on its rear face, and a detent mechanism 14 carried by the fan section and cooperating with the member 13 to control the relative angular positions of the two sections and thereby the rate of axial fluid flow through the device. Hub 11 is carried by the usual shaft 15 driven by V-belt 17.

The two sections of the rotor device are each formed essentially of a number of circular and annular sheet metal parts designed especially for inexpensive manufacture. The rear fan section, for instance, includes a circular mounting plate 18 attachable to the forward end of the driving hub 11, an annular bracket plate 19, an annular inner mechanism carrying plate 20 forming with plates 18 and 19 a hollow inner hub portion of the section, and an outer annular vaned plate 21. Mounting element 18 has a central rearwardly facing recess 22 formed to receive driving hub 11 and attachable to that hub by nuts 23 threaded onto the usual fan mounting studs. It is contemplated that the formation of this attaching plate may be varied to permit attachment of the device to driving hubs of various designs while the rest of the mechanism remains unchanged. Element 18 extends radially outwardly from its central recessed attaching portion and then axially at an outer location to form a cylindrical outer mounting portion 24 to which the rest of the fan device may be attached as a unit. To permit such attachment, bracket plate 19 is cylindrical and receivable about the outer cylindrical portion 24 of the mounting element 18, and contains a number of peripherally spaced and angularly extending fastener slots 25 registering with corresponding openings in the mounting element and through which screws 26 extend for rigid attachment of the fan to the mounting element. At its forward end, member 19 is turned inwardly to form an annular flange attachable by a number of angularly spaced screws 27 to the overlapping edge portions of the inner and outer fan section plates 20 and 21.

The outer vaned annular member 21 extends first forwardly from its point of connection by screws 27 to the other fan section parts and then radially outwardly at 28 to an outer rearwardly turned reinforcing rim 29. As best seen in Fig. 5, this outer radial portion 28 of the sheet metal member 21 is cut and deformed at angularly spaced locations to form a series of spaced fan blades or vanes 30 extending angularly to the rear and acting to induce a rearward flow of air upon rotation. Preferably, the area of the material deformed to form each of these blades is substantially the same as the areas of each of the undeformed intermediate shutter surfaces 31.

At the outer edge of each of the shutter surfaces 31, the sheet metal of plate 21 is locally bulged to form a forwardly facing recess 32 within which roller 33 is rotatably mounted to serve as a bearing for engaging the forward shutter section of the device to maintain the fan and shutter sections in predetermined spaced relation.

Referring to Fig. 6, recess 32 may be of essentially rectangular radial section to receive a U-shaped spring metal bearing member 34. Body 35 of roller 33 presents a pair of laterally projecting tapered pin portions 36 receivable within predetermined indentations in the sheet metal bearing member 34 to rotatably mount the roller. The body of the roller carries an outer O-ring 37 of rubber or the like received within a pre-formed annular recess in the surface of the roller body and acting to engage the shutter section of the apparatus. Because of the unique formation of rollers 33 and their spring metal bearing members 34, these elements may be quickly and easily inserted into their respective mounting recesses with a minimum of difficulty and expense.

The inner sheet metal part 20 of the fan section is separately formed in order that it may be bodily removed from the rest of the apparatus and replaced when the parts of the detent mechanism carried by this plate becomes worn. Plate 20 extends first radially inwardly from its point of attachment to the other parts by screws 27, then forwardly at 38, inwardly at 39 and finally forwardly and inwardly about the outer race of contact mounting bearing 40. The outer race of this bearing is retained at its rear side by a retainer plate 41 attached by screws 42 to the rear face of plate 20. Stationary terminal screw 43 extends through and is rigidly attached to the inner race of bearing 40, and has a rear contact head 44 engageable by contact arm 45 mounted to but insulated from plate 20 by screw 46. This contact arm is in turn electrically connected to a detent actuating solenoid, as will later appear. Terminal screw 43 is attached at its forward end to a stationary electrical lead 47, and is suitably insulated from bearing 40.

Detent mechanism 14 includes a detent control disk 48 mounted for rotation at the forward side of the fan section of the device by a rearwardly extending shaft 49 rigidly connected to the disk and rotatable within spaced bearings 50. These bearings are received at opposite sides of an inner annular projection within tubular mounting member 51 whose forward peripheral flange 52 is attached to plate 20 by screws 53. Shaft 49 is threaded at its rear end for connection to a bearing retainer 54, which also serves as a dust cap for the bearings. Retainer 54 is locked in its assembled relation to shaft 49 by nut 55.

Disk 48 threadedly carries a forwardly projecting detent pin or lug 56 at an eccentric location and acts to move that pin radially of the fan upon rotation of the disk. A spiral spring 57 received about shaft 49 and member 51 normally operates to rotate disk 48 in a direction moving pin 56 outwardly. For this purpose, one end 58 of the spring is connected to the threaded rear end of shaft 49, and the other end 59 of the spring is turned inwardly for selective reception within any of a number of openings 60 spaced about flange 52 of member 51. As will be appreciated, the tension of the spring is regulated by insertion of its forward end within different ones of these openings 60.

Figures 8, 10, 12:
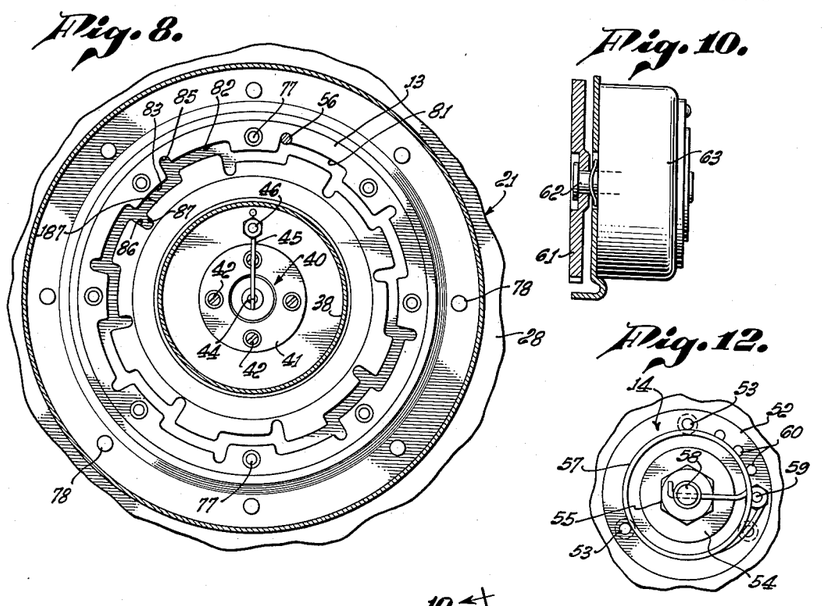
Fig. 8 is a transverse section through the device taken on line 8—8 of Fig. 4 and showing especially the form of the labyrinth recess in the forward section.
Fig. 10 is an enlarged fragmentary section taken on line 10—10 of Fig. 9 and showing the rotary solenoid and its associated gear.
Fig. 12 is an enlarged fragmentary view showing the spiral spring for returning the pin to normal and taken on line 12—12 of Fig. 4.
Figure 9:
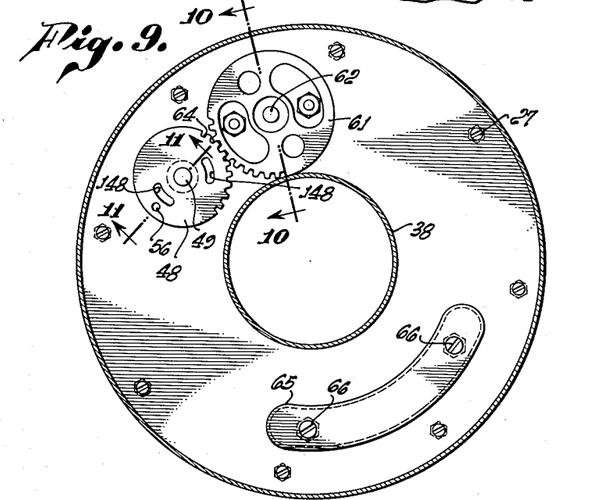
Fig. 9 is a transverse section taken on line 9—9 of Fig. 4 and showing the pin actuating gear mechanism.

At a position angularly adjacent disk 48, plate 20 carries a gear wheel 61 driven through shaft 62 by a rotary solenoid 63 mounted to the rear face of the plate (see Figs. 9 and 10). Wheel 61 and disk 48 have interengaging gear teeth 64 extending about a portion of their peripheries and acting to transmit rotation of the solenoid and its gear into rotation of the disk 48 and consequent radial movement of detent pin 56. The solenoid when energized tends to rotate in a direction moving pin 56 inwardly against the tendency of coil spring 57. Upon deenergization of the solenoid, spring 57 then returns pin 56 to a radially outer position. The energization of the solenoid is remotely controlled, as by a conventional thermostatic switch responsive to the cooling water temperature in an internal combustion engine. Current is supplied to this solenoid through the metallic body of the fan device, and through lead 47, contact screw 43, and contact 45.

As seen in Figs. 4 and 9, plate 20 carries a counterweight 65 mounted by screws 66 at a location opposite the detent mechanism and serving to balance this plate about its axis of rotation. Also, disk 48, gear wheel 61, and their associated parts, are balanced about their respective axes, by the formation of suitable openings 148 in the gear and disk, to avoid any tendency for actuation of the detent mechanism by centrifugal force upon rotation of the device as a whole. Finally, shaft 49, disk 48, and their associated parts, are balanced to the front and rear of bearings 50.

On its forward face, plate 20 carries an annular forwardly projecting inner bearing race element 67 attached to the plate by the screws 42 and serving to rotatably mount the forward shutter section 12. About its outer face, this bearing race has an annular groove within which balls 68 are received. At its forward edge, bearing race 67 has an outwardly projecting flange 69 for protecting the balls and their engaging surfaces from dust.

The forward shutter section 12, like the rear fan section 10, is formed of a number of annular sheet metal plates. Specifically, section 12 includes a pair of inner forward and rear plates 70 and 71, and an outer annular apertured plate 72. The two inner plates 70 and 71 are interconnected near their inner edges by rivets 73, and their inner edges are oppositely curved at 74 to form together a substantially semi-cylindrical outer race engaging the balls 68. Outwardly of connecting rivets 73, the rear plate 71 is deformed to present an annular rearwardly facing recess 75 rectangular in radial section for receiving an annular detent cam member 13, which is preferably formed of hard rubber or similar quietly operating though long wearing material. This cam element may be bonded directly to plate 71 or retained by screws 77 serving also to interconnect the two plates 70 and 71.

Outwardly of the detent cam, plate 71 is connected by rivets 78 to the outer annular shutter plate 72. This outer plate extends parallel and closely adjacent the outer vaned plate 21 of the fan section. Plate 72 has a number of radially enlarging angularly spaced apertures 79, between which the plate forms intermediate shutter surfaces 80. These apertures 79 and shutter surfaces 80 are substantially equal in angular extent and are spaced in correspondence with the blades 30 and shutter surfaces 31 of the fan section. With the two sections 10 and 12 in the relative angular positions of Fig. 5, shutter surfaces 31 of the rear section extend across apertures 79 of the forward section to close those apertures and preclude the passage of any substantial amount of air through the device. When, however, the two sections are relatively rotated to a condition in which shutter surfaces 31 are immediately opposite shutter surfaces 80 and blades 30 of the rear section are positioned opposite apertures 79 of the forward section, the fan blades are exposed and free to draw air through apertures 79.

Figure 11:
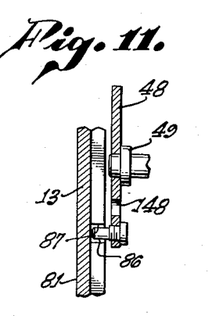
Fig. 11 is a section taken on line 11—11 of Fig. 9 showing the detent pin and its carrying disk.

The relative angular position of sections 10 and 12 is determined by the radial shifting movement of detent pin 56 relative to detent cam 13. For this purpose, cam 13 contains a relatively narrow rearwardly facing, essentially annular labyrinth recess or groove 81 extending about the face of the cam element and within which the detent pin is movably received (Figs. 8 and 11). This labyrinth recess comprises a succession of arcuate portions 82 and 83 extending alternately at two different radial distances from the center of rotation of the device. At one end of each of the outer arcuate portions 82 and 83 extending alternately at two different radial distances from the center of rotation of the device. At one end of each of the outer arcuate portions 82 of the recess, the cam element presents a radial stop shoulder 84 against which the pin abuts after a shifting movement. Adjacent each shoulder 84, the wall of the recess contains an outwardly extending locking notch 85 into which the pin is movable to lock the sections in certain predetermined relative angular positions. Similarly, at a corresponding end of each inner portion 83 of the cam recess, the cam element presents a radial shoulder 86 radially offset from shoulders 84, and an inwardly extending locking notch 87. The various inner and outer arcuate portions 82 and 83 of the labyrinth recess interconnect at the location of the locking branches 85 and 87. The angular extent of each of the arcuate portions of the recess is equal to the angular extent of the shutter surfaces 31 and 80, apertures 79 and the openings formed by blades 30.

In use, the fan is mounted to driving hub 11 by first separately attaching mounting element 18 to the hub and then attaching the rest of the device to this mounting element by screws 26. Solenoid 63 is then electrically connected, through the body of the engine and lead 47, to a source of control current, preferably under the control of a thermostat 247 responsive to the engine cooling water temperature. Hub 11 is normally driven continuously, and the effectiveness of the fan to draw air varied by controlling the relative angular positions of the two rotating sections 10 and 12.

Rotary solenoid 63 is deenergized by thermostat 247 whenever the cooling water temperature rises above a certain predetermined value.

When the solenoid is thus deenergized, spring 57 acts to rotate disk 48 through shaft 49 in a direction moving detent pin 56 carried by the disk radially outwardly and into one of the outwardly extending locking notches 85 of recess 81, as for instance, to the position of Fig. 8. In this condition, the fan section 10 and shutter section 12 are rotatably interlocked, with fan blades 30 received directly behind apertures 79 in the shutter section. The fan blades consequently serve to draw air axially through apertures 79 and through the radiator.

Solenoid 63 is energized by the thermostat upon a fall of the water jacket temperature to a second predetermined value. When thus energized, the solenoid rotates gear wheel 61 and through it disk 48 against the tendency of spring 57 and in a direction moving pin 56 radially inwardly from within locking branch 85 of the cam recess and to a radius corresponding to the next adjacent inner arcuate portion 83 of the cam recess. With the pin moved inwardly to this condition, the shutter section is free to move angularly relative to the fan section through a predetermined arc and until the pin engages the next successive radial shoulder 86 by which such relative angular movement is limited.

During such relative movement of the sections, the inward shifting movement of the pin is limited by engagement with wall or shoulder 187 extending along the inner side of the recess. As the pin engages shoulder 86, it reaches a position opposite one of the locking notches 87 and is urged into that locking branch by the solenoid. The fan and shutter sections are thus rotatively interlocked in a second relative angular position in which shutter surfaces 31 of the fan section are received directly behind apertures 79 of the shutter section to close those apertures and prevent the passage of any substantial amount of air axially through the device. The sections remain in this relative condition until the solenoid is again deenergized and spring 57 is free to move pin 56 outwardly into the next successive locking position in which the fan is again opened. Relative movement of the sections when permitted by pin 56 is effected as a result of the natural tendency for the then undriven shutter section to slow under the influence of air resistance.

When the fan is closed against axial fluid flow by reception of shutter surfaces 31 of the fan section behind apertures 75 of the shutter section, the device commences to act as a centrifugal impeller, in which vanes 30 draw air forwardly from the rear of the fan and discharge it radially outwardly (see Fig. 2). As this air is drawn forwardly toward the fan, it passes slowly over and is warmed by the engine. Since the rear edge of shroud 103 extends to a position of axially overlapping relation with the fan blades, it picks up a part of this radially outward flow of warm air created by the fan in its closed condition and directs that air forwardly to pressurize the space in front of the shutter section. A certain amount of this warm air under pressure passes forwardly through the radiator to prevent any sharp and undesired drop in the radiator temperature.

Shroud 103 only partially overlaps the fan blades, so that a rear portion of the radially outward flow of air is not contacted by the shroud. This portion of the air stream is confined by the hood, partition 205 and wall 206 in a manner directing it rearwardly about the outer portions of the underhood compartment, to then reverse its direction and flow forwardly over the warm engine and back to the rear suction side of the centrifugal impeller. The entire underhood compartment is thus circulated with warm air, and the outer portions of the compartment are pressurized by the warm air in a manner preventing the entrance of appreciable quantities of cold air. Such warming of the engine compartment is particularly important about the lower crankcase portion of the engine, where it prevents the cooling or freezing of the lubricating oil and thus prevents the development of the usual sludge in the oil system.

As brought out previously, it is important that the air flow controlling shutters (comprising the shutter portions 31 and 80 of the fan and shutter sections of the rotor) be positioned in close proximity to the fan blades or vanes 30, so that the fan is effectively convertible to a centrifugal impeller. In this connection it is noted that in the preferred form of fan shown in the drawings (see Fig. 4), the axial distance between the shutters and the vanes is less than, and desirably small as compared with, the axial extent of the vanes. As a matter of fact, some of the shutter portions (31) are not spaced at all from the vanes but are actually formed integrally therewith.

Figure 13:
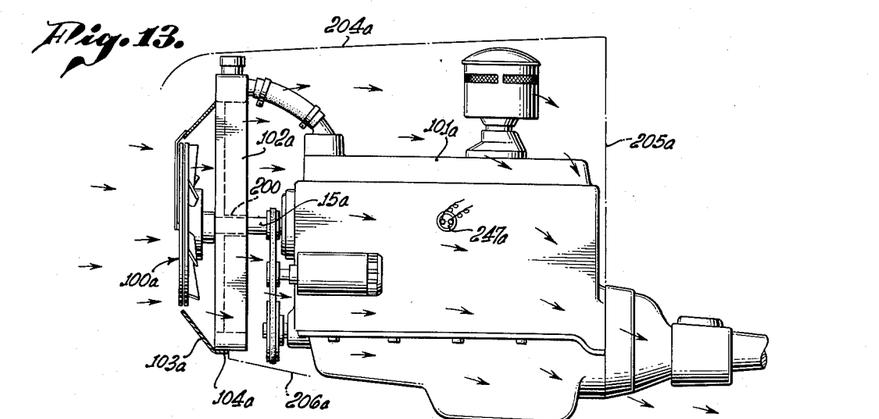
Fig. 13 is a side view of a variational form of engine temperature control system embodying the invention, the apparatus being shown in its radiator cooling condition.
Figure 14:
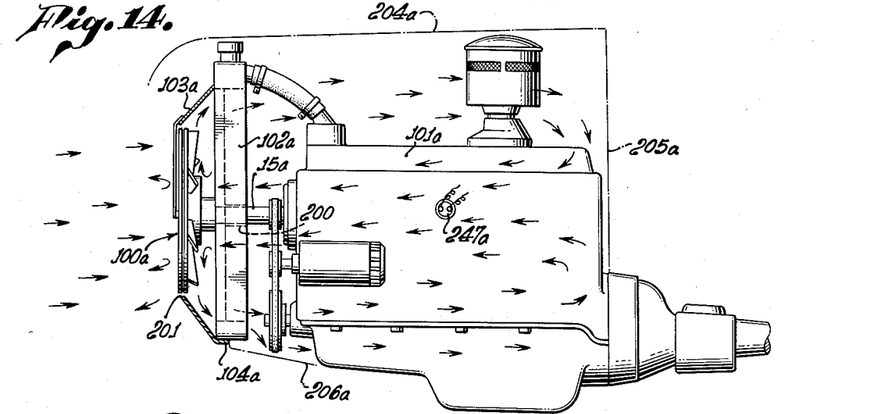
Fig. 14 is a view corresponding to Fig. 13 and showing the apparatus in non-cooling condition.
Figure 15:
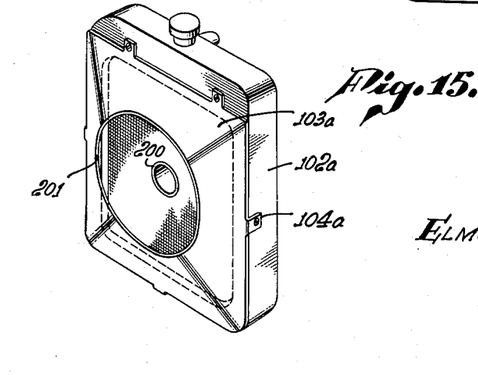
Fig. 15 is a perspective view of the air directing shroud in Figs. 13 and 14.

Figs. 13 through 15 show a variational form of engine temperature controlling system, employing a variable flow fan 100a of the same type employed in Figs. 1 through 12, but in this case positioned forwardly of the radiator 102a. The fan is carried and driven by a shaft 15a projecting forwardly from engine 101a and through a tubular bushing 200 in the radiator. A tubular shroud 103a converges forwardly from the outer edge portion of the radiator to a circular forward edge 201 extending about the outer edge of the fan. The forward edge portion 201 of the shroud is positioned as close as practically possible to the fan, so that the fan in closed condition forms a substantially complete closure across the forward end of the shroud. The shroud is mounted to the radiator in any convenient manner, as by a number of tabs 104a projecting from the shroud and fastened to the radiator.

As in the first form of the invention, the engine is contained within a compartment formed by hood 204a, rear partition 205a and a partial bottom wall 206a. Actuation of the fan between its open and closed conditions is controlled by thermostat 247a in accordance with changes in the engine cooling water temperature.

At all times when the engine water temperature is above a predetermined value, thermostat 247a maintains the fan in its open or axial flow condition of Fig. 13. In this condition, the fan draws air inwardly from its forward side, and discharges it rearwardly through the radiator and past the engine to the usual outlets at the underside of the engine.

The draft of air through the radiator cools the engine water, ultimately to a predetermined temperature at which thermostat 247a actuates the fan to its Fig. 14 closed condition. When the fan is thus closed, it forms a barrier across the forward end of the shroud preventing the admission of cooling air to the radiator. Closure of the fan also converts it to a centrifugal impeller drawing warmed air forwardly from over the engine and through the radiator, and discharging it radially outwardly. Shroud 103a deflects the radially outward flow of warmed air rearwardly through the outer portions of the radiator and into the outer portions of the underhood compartment. The underhood compartment is thus pressurized against the entrance of cold air in the same manner as in the first form of the invention. As the rearwardly moving warm air at the outer portions of the underhood compartment reaches the rear of the compartment, it reverses its flow to pass forwardly over the warm engine and back to the rear suction side of the impeller.

I claim:

1. A fluid circulation system comprising a rotatable fan normally taking suction and discharging axially and having angular fluid displacement blades, shutter means at the suction side of said fan operable between open and closed conditions while the fan is in operation, said shutter means in closed condition being disposed across said suction side of the fan in close proximity to said blades and acting to convert the fan to a centrifugal impeller discharging fluid radially outwardly, and baffle means positioned in the path of said radially outward flow of fluid and deflecting a portion thereof in a direction axially of the fan.

2. A fluid circulation system comprising a rotatable fan normally taking suction and discharging axially and having angular fluid displacement blades, shutter means at the normal suction side of said fan operable between open and closed conditions while the fan is in operation, said shutter means in closed condition being disposed across said suction side of the fan in close proximity to said blades and acting to convert the fan to a centrifugal impeller discharging fluid radially outwardly, said shutter means in closed condition being of an extent to shut off the fluid flow to said blades across substantially the entire normal suction side thereof so that the fan when acting as a centrifugal impeller takes suction from its normal discharge side, and baffle means positioned in the path of said radially outward flow of fluid and deflecting a portion thereof in a direction axially of the fan.

3. A cooling system comprising a radiator, a rotatable fan positioned opposite the radiator and having angular fluid displacement blades normally taking suction and discharging axially, shutter means at the normal suction side of said fan and at the same side of the radiator as said fan, said shutter means being operable between open and closed conditions while the fan is in operation and in said closed condition being disposed across said suction side of the fan in close proximity to said blades to convert the fan to a centrifugal impeller discharging fluid radially outwardly, said shutter means in close condition being of an extent to shut off the fluid flow to said blades across substantially the entire normal suction side of the fan so that the fan when acting as a centrifugal impeller takes suction from its normal discharge side, and baffle means positioned in the path of said radially outward flow of fluid and deflecting a portion thereof axially toward the radiator.

4. A fluid circulation system comprising a rotatable fan normally taking suction and discharging axially and having angular fluid displacement blades, shutter means at the normal suction side of said fan operable between open and closed conditions while the fan is in operation, said shutter means in closed condition being disposed across said suction side of the fan in close proximity to said blades to convert the fan to a centrifugal impeller discharging fluid radially outwardly, said shutter means in closed condition being of an extent to shut off the fluid flow to said blades across substantially the entire normal suction side of the fan so that the fan when acting as a centrifugal impeller takes suction from its normal discharge side, and baffle means positioned in the path of said radially outward flow of fluid and deflecting predetermined portions thereof in opposite axial directions, said baffle means having a fluid directing surface with a portion converging toward the fan axis and only partially axially overlapping the fan blades to deflect one of said portions of the fluid flow in one of said axial directions.

5. A fluid circulation system comprising a fan rotatable about an axis and having angular fluid displacement blades normally taking suction and discharging axially, shutter means adjacent the fan and operable between open and closed conditions while the fan is in operation, said shutter means in closed condition being disposed transversely across a side of the fan in close proximity to said blades along the major portion of their radial extent to convert the fan to a centrifugal impeller discharging fluid radially outwardly, said shutter means in closed condition being of an extent to shut off substantially the entire normal axial fluid flow at said side of the fan, and a baffle having a fluid directing surface with a portion converging toward said axis, said converging portion of said baffle surface being positioned directly in the radially outward path of fluid from the fan when the fan is acting as a centrifugal impeller to deflect a portion of said fluid in an axial direction.

6. A cooling system comprising a liquid containing radiator, a rotatable fan positioned opposite the radiator and having angular fluid displacement blades normally taking suction and discharging axially, shutter means positioned at the normal suction side of said fan and at the same side of the radiator as said fan, said shutter means being operable between open and closed conditions while the fan is in operation and in said closed condition being disposed across said suction side of the fan in close proximity to said blades to convert the fan to a centrifugal impeller discharging fluid radially outwardly, said shutter means in closed condition being of an extent to shut off the fluid flow to said blades across substantially the entire normal suction side of the fan so that the fan when acting as a centrifugal impeller takes suction from its normal discharge side, baffle means positioned in the path of said radially outward flow of fluid and deflecting a portion thereof axially toward the radiator, and thermostatic control means for actuating said shutter means between said open and closed conditions in accordance with changes in the temperature of the radiator liquid.

7. Apparatus comprising a rotatable axial flow fan having angular air displacement blades normally taking suction and discharging at axially opposite sides of the fan, shutter means at a first one of said sides of the fan and operable between open and closed conditions, said shutter means in closed condition being of an extent to substantially completely close off the normal axial flow at said first side of the fan and being positioned in close proximity to said blades to convert the fan to a centrifugal impeller drawing air from the second side of the fan and discharging it radially outwardly, a unit of operating mechanism producing substantial heat in operation and positioned along the path of air to said second side of the fan to heat said air, and baffle means positioned in the radially outward path of said heated air from the fan and deflecting a portion thereof in a direction axially of the fan.

8. Apparatus comprising a rotatable axial flow fan having angular air displacement blades normally taking suction and discharging at axially opposite sides of the fan, shutter means at a first one of said sides of the fan and operable between open and closed conditions, said shutter means in closed condition being of an extent to substantially completely close off the normal axial flow at said first side of the fan and being positioned in close proximity to said blades to convert the fan to a centrifugal impeller drawing air from the second side of the fan and discharging it radially outwardly, a heat producing liquid cooled internal combustion engine driving said fan and positioned generally opposite said second side thereof to heat the air drawn to the fan when it is acting as a centrifugal impeller, baffle means positioned in the radially outward path of said heated air from the fan and deflecting a portion thereof in a direction axially of the fan, and thermostatic control means for actuating said shutter means between opened and closed conditions in accordance with changes in the temperature of the engine cooling liquid.

9. Apparatus comprising a heat producing internal combustion engine, a radiator for cooling liquid from said engine, a rotatable normally axial flow fan having angular fluid displacement blades and driven by the engine, said fan axially facing the radiator to create a flow of cooling air therethrough, shutter means disposed transversely across a first axial side of said fan and operable between open and closed conditions, said shutter means in closed condition being of an extent to substantially completely close off the normal axial flow at said first side of the fan and being positioned in close proximity to the fan blades to convert the fan to a centrifugal impeller drawing air from a second side of the fan opposite said first side and discharging it radially outwardly, said engine being positioned opposite said second side of the fan to warm the air drawn thereto, and a tubular shroud extending from the outer portion of said radiator to a location about the fan to deflect a portion of said radially outward flow of heated air axially toward the radiator.

10. A cooling system comprising a radiator, a fan axially facing said radiator and having angular fluid displacement blades normally discharging an axial flow of cooling air through the radiator, shutter means disposed transversely across a side of said fan and operable between open and closed conditions, said shutter means in closed condition being positioned in close proximity to said blades to convert the fan to a centrifugal impeller discharging air radially outwardly, and baffle means positioned in the path of said radially outward flow of air and deflecting a portion thereof in a direction axially of the fan and toward said radiator.

11. A cooling system comprising a radiator, a normally axial discharge fan axially facing said radiator and having angular fluid displacement blades creating a flow of cooling air through the radiator, shutter means disposed across the side of said fan facing the radiator and operable between open and closed conditions, said shutter means in closed condition being of an extent to shut off substantially completely the normal axial flow at said side of the fan and being positioned in close proximity to the fan blades whereby the fan is converted to a centrifugal impeller drawing air from a side opposite that facing the radiator and discharging it radially outwardly, and a tubular shroud extending and converging between the outer portion of said radiator and a location about and in axially overlapping relation to said fan to deflect a portion of said radially outward flow of air axially toward the radiator, said shutter means being pheripherally spaced from the shroud.

12. Apparatus comprising an internal combustion engine, a radiator for cooling liquid from said engine and positioned at a forward side thereof, a normally axial flow fan between the engine and radiator facing the radiator and driven by the engine, said fan having angular blades normally drawing air inwardly through the radiator and discharging it rearwardly over the engine, shutter means extending across substantially the entire forward side of said fan and operable between open and closed conditions, said shutter means in closed condition being positioned in close proximity to the fan blades to convert the fan to a centrifugal impeller drawing warm air forwardly from over the engine and discharging it radially outwardly, a tubular shroud extending and converging between the outer portion of the radiator and a location about and axially overlapping the fan to deflect a forward portion of said radially outward flow of air forwardly toward the radiator, said shutter means being peripherally spaced from the shroud to pass said forwardly flowing air, said shroud only partially axially overlapping the fan so that a rear portion of the radially outward flow of air is not deflected forwardly, and housing means about the engine rearwardly of the fan confining and directing said rear portion of the radially outward flow of air to pass rearwardly at locations spaced outwardly from the engine and then be drawn forwardly past the engine to the fan.

13. Apparatus comprising an internal combustion engine, a radiator for cooling liquid from said engine and positioned at a forward side thereof, a normally axial flow fan positioned forwardly of and axially facing the radiator and having angular blades normally discharging cooling air rearwardly through the radiator and over the engine, shutter means extending across the forward side of said fan and operable between open and closed conditions, said shutter means in closed condition being positioned in close proximity to the fan blades to convert the fan to a centrifugal impeller drawing warm air forwardly from over the engine and through the radiator and discharging it radially outwardly, a tubular shroud extending forwardly from the outer portion of the radiator to a location near the outer portions of said shutter means to deflect said radially outward flow of air rearwardly through the radiator and into the space about the engine, and housing means about the engine confining said rearward flow of warm air.

14. Fluid circulating apparatus comprising a rotatable fan normally taking suction and discharging axially, shutter means rotatable with said fan and adjustable between relatively opened and closed conditions, said shutter means in closed condition extending across a side of the fan to convert it to a centrifugal impeller discharging fluid radially outwardly, said shutter means in closed condition being of an extent to shut off substantially the entire normal axial fluid flow at said side of the fan, and baffle means positioned in the path of said radially outward flow of air and deflecting a portion thereof in a direction axially of the fan.

15. Fluid circulating apparatus comprising a radiator, a rotatable fan positioned opposite said radiator and normally taking suction and discharging axially to create a flow of cooling air through the radiator, shutter means rotatable with said fan and adjustable between relatively opened and closed conditions, said shutter means in closed condition extending across a side of the fan to convert it to a centrifugal impeller discharging fluid radially outwardly, and baffle means positioned in the path of said radially outward flow of air and deflecting a portion thereof in an axial direction toward the radiator.

16. Fluid circulating apparatus comprising a rotatable fan normally taking suction and discharging axially, shutter means rotatable with said fan and adjustable between relatively opened and closed conditions, said shutter means in closed condition extending across a first side of the fan to convert it to a centrifugal impeller drawing fluid axially from the second side of the fan and discharging it radially outwardly, an internal combustion engine driving said fan and positioned along the path of fluid to said second side of the fan to heat said fluid, and baffle means positioned in the path of said radially outward flow of air and deflecting a portion thereof in a direction axially of the fan.

17. Apparatus comprising an internal combustion engine, a radiator for cooling liquid from said engine and positioned at a forward side thereof, a normally axial flow fan between the engine and radiator facing the radiator and driven by the engine, said fan having angular blades normally drawing air inwardly through the radiator and discharging it rearwardly over the engine, shutter means rotatable with said fan and adjustable between open and closed conditions, said shutter means in closed condition extending across the forward side of the fan to convert it to a centrifugal impeller drawing warmed air forwardly from over the engine and discharging it radially outwardly, a tubular shroud extending between the outer portion of said radiator and a location about the fan and directing a forward portion of said radially outward flow of air forwardly toward the radiator, and means directing a rear portion of said radially outward flow of air rearwardly to pass rearwardly at locations spaced outwardly from the engine and then be drawn forwardly over the engine to the fan.

18. Apparatus comprising an internal combustion engine, a radiator for cooling liquid from said engine and positioned at a forward side thereof, and a normally axial flow fan positioned forwardly of and axially facing the radiator and having angular blades normally discharging cooling air rearwardly through the radiator and over the engine, shutter means rotatable with said fan and adjustable between open and closed conditions, said shutter means in closed condition extending across the forward side of the fan to convert it to a centrifugal impeller drawing warmed air forwardly from over the engine and through the radiator and discharging it radially outwardly, a tubular shroud extending forwardly from the outer portion of said radiator to a location near the outer portions of said shutter means to deflect said radially outward flow of air rearwardly through the radiator and into a space about the engine.

19. Fluid circulating apparatus comprising a liquid containing radiator, a rotatable fan positioned opposite said radiator and normally taking suction and discharging axially to create a flow of cooling air through the radiator, shutter means rotatable with said fan and adjustable between relatively opened and closed conditions, said shutter means in closed condition extending across a side of the fan to convert it to a centrifugal impeller discharging fluid radially outwardly, baffle means positioned in the path of said radially outward flow of air and deflecting a portion thereof in an axial direction toward the radiator, and thermostatic control means for actuating said shutter means between opened and closed conditions in accordance with changes in the temperature of the radiator liquid.

20. Temperature control apparatus comprising a radiator, a fan opposite said radiator operable to create a flow of air therethrough, a shroud extending between said radiator and fan to direct air therebetween and extending to a location about a portion of the fan, shutter means in said shroud between the fan and radiator and operable between an open position for passing air axially through the radiator and fan, and a closed position closing off said axial flow, there being an air flow passage through the shroud past said shutter means when the shutter means are closed, and said fan being operable to create a flow of air through said passage toward the radiator when said shutter means are closed.

21. Temperature control apparatus comprising a radiator, a fan opposite said radiator, a shroud disposed between said radiator and fan to direct air flow therebetween, shutter means between said radiator and fan within said shroud and actuable between relatively open and closed positions, there being a passage through which air may flow between the fan and radiator even when said shutter means are closed, said fan being operable when the shutter means are in said open condition to draw air axially through the radiator and shroud, and when the shutter means are in said closed condition to force air through said passage to the radiator, and temperature responsive means for actuating said shutter means.

22. A fluid circulation system comprising a radiator, a rotatable fan opposite said radiator normally taking suction and discharging axially and having angular fluid displacement blades, shutter means at the suction side of said fan operable between open and closed conditions while the fan is in operation, said shutter means in closed condition being disposed across said suction side of the fan in close proximity to said blades and acting to convert the fan to a centrifugal impeller discharging fluid radially outwardly, and baffle means positioned in the path of said radially outward flow of fluid and deflecting a portion thereof axially toward the radiator.

23. In combination a radiator adapted to receive air therethrough, a bladed fan axially spaced from the radiator to flow air through the radiator, a sleeve having one open end secured to the outer peripheral portion of the radiator and the other open end receiving at least a portion of the fan blades therein, a shutter mounted in the sleeve between the fan and radiator, said shutter having an open position for axial flow of air through the radiator and fan and a closed position for blocking said axial flow, means providing a passageway through the shroud even when the shutter is closed, and the blades of said fan being arranged to propel air from said other open end of the shroud through said passageway to the radiator when said shutter is closed.

24. In combination with a radiator and fan assembly of a heat engine, a shroud between the radiator and fan, a shutter in the shroud between the radiator and fan, heat sensitive means controlling the shutter, means providing an air flow passage between the fan and radiator irrespective of the open or closed condition of the shutter, and said fan being effective to force air through said passage back to the radiator when the shutter is closed and to pull air through the radiator and shroud when the shutter is open.

25. In an assembly for controlling air flow in a fan and radiator assembly of a liquid cooled internal combustion engine, a shroud, a shutter assembly mounted within said shroud and actuatable between an open position permitting air flow therethrough and a closed position substantially blocking air flow therethrough, said shroud being arranged for disposition between the radiator and the fan with said shutter assembly in spaced confronting relation to the inlet face of the fan, and means providing an air flow passageway from the periphery of the fan to said radiator irrespective of the open or closed condition of said shutter assembly.

References Cited in the file of this patent

UNITED STATES PATENTS

| | | |
|---|---|---|
| 1,170,730 | Benjamin et al. | Feb. 8, 1916 |
| 1,412,313 | Negri | Apr. 11, 1922 |
| 1,611,658 | Magni | Dec. 21, 1926 |
| 1,903,134 | Ream | Mar. 28, 1933 |
| 2,146,501 | Flautt | Feb. 7, 1939 |
| 2,210,155 | Szdlowski et al. | Aug. 6, 1940 |
| 2,273,000 | Hans | Feb. 10, 1942 |
| 2,383,001 | Mader | Aug. 21, 1945 |
| 2,388,208 | Foss | Oct. 30, 1945 |
| 2,626,743 | Sanders | Jan. 27, 1953 |
| 2,638,881 | Pankuch et al. | May 19, 1953 |